No. 698,822. Patented Apr. 29, 1902.
G. W. CROSS.
CONVEYER.
(Application filed Sept. 9, 1901.)
(No Model.)
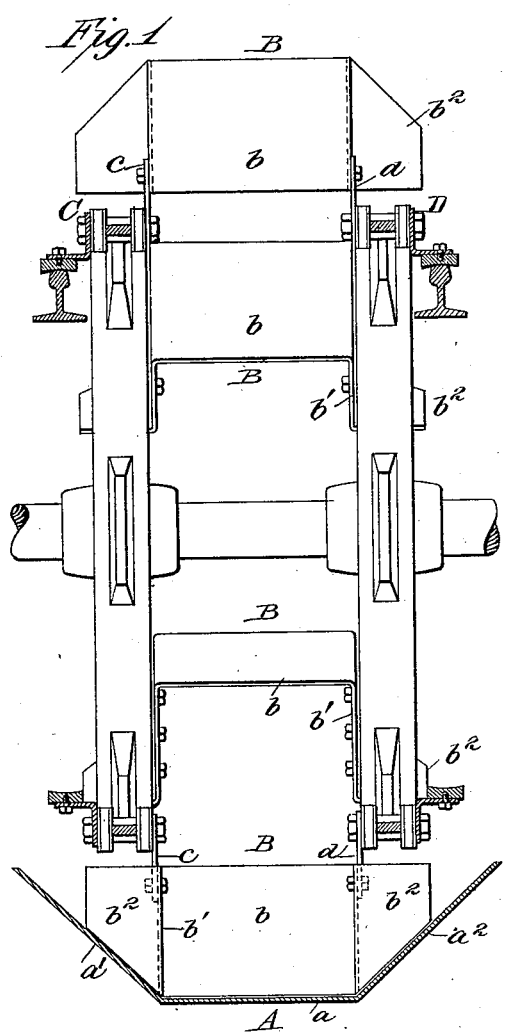
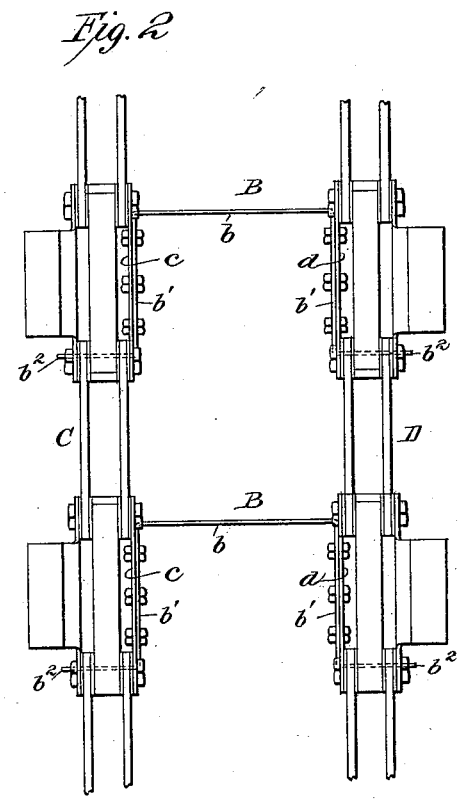
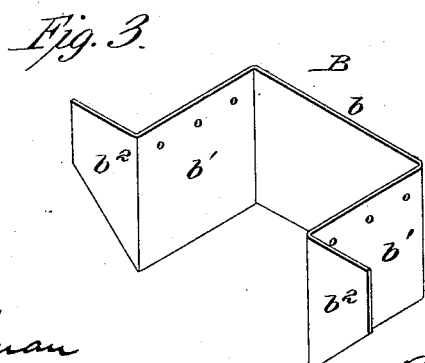
Witnesses:
Jas. F. Coleman
Jno. Robt Taylor
Inventor
George W. Cross
By Dyer, Edmonds & Dyer
Attorneys
THE NORRIS PETERS CO., PHOTO-LITHO., WASHINGTON, D. C.

UNITED STATES PATENT OFFICE.

GEORGE W. CROSS, OF CARBONDALE, PENNSYLVANIA.

CONVEYER.

SPECIFICATION forming part of Letters Patent No. 698,822, dated April 29, 1902.

Application filed September 9, 1901. Serial No. 74,712. (No model.)

*To all whom it may concern:*

Be it known that I, GEORGE W. CROSS, a citizen of the United States, residing at Carbondale, in the county of Lackawanna and State of Pennsylvania, have invented a certain new and useful Improvement in Conveyers, of which the following is a description.

This invention relates to conveyers for moving material—such as coal, ore, stone, &c.—
and to that type of such conveyers in which is employed an endless chain or chains to which are connected flights or buckets which receive and move the material.

The object of the invention is to provide a mechanism which shall consist of few parts having maximum strength and which shall be capable of ready and easy adjustment and substitution of worn parts without dismantling and practically reorganizing the structure.

As an embodiment of the invention I shall describe that form in which it is used for moving material in a horizontal or slightly-inclined plane. In conveyers of this character it is common to employ a stationary chute, endless chains, and flights driven by said chains and operating within said chute. The material is fed to the chute through a hopper and carried along therein by means of the flights to the desired point. In apparatus of this character many important requirements are present, including the necessity for maximum strength in the conveyer-flights, capacity to resist the wearing and disrupting influence due to the conveying operation, provision for the ready removal of worn parts, and the substitution of new parts therefor.

In carrying out my invention as applied to a flight conveyer, as above referred to, I employ the usual frame, driving-sprockets, and chute, the latter having, preferably, a flat bottom and inclined sides. Above this chute operate the chains driven by said sprockets, and secured at suitable intervals to such chains are flights, each preferably made of a single plate of sheet-steel, substantially U-shaped in form, so as to comprise a main operative portion coacting with the flat bottom of the chute, sides arranged substantially at right angles to such main portion and provided with means of attachment to the drive-chains, and outwardly-extending ends substantially parallel with said main portion, such ends projecting over the inclined sides of the chute and their under edges being beveled or cut away in order that the under edges of the flight as a whole may maintain intimate contact with the working face of the chute.

Conveyer-flights constructed as indicated herein have been found to overcome many serious defects in flights heretofore employed. The latter have consisted of straight metallic sheets or plates secured to the driving-chains and extending not only over the bottom of the chute, but to some extent over the inclined sides thereof. Not only do flights so constructed lack necessary durability, but due to the resilience of the metal or to the weight of the material being conveyed they frequently become bent and disarranged, with the result that they fail to catch and move the desired quantity of material. Again, it frequently happens that a portion of the material is forced up the inclined side of the chute, whence it escapes. In the use of the U-shaped flights of this invention the main operative portion which coacts with the bottom of the chute receives the major part of the wear of the material. This portion is strengthened by the right-angled sides, which are secured to the drive-chains, and the ends of the flight, which are substantially parallel with the main portion, extend part or all of the way up the inclined sides of the chute, serving thereby not only to conduce to the rigidity of the flight as a whole, but also to direct the particles riding on such inclined sides toward the center of the flight. Flights so constructed not only avoid the defects hereinbefore referred to in preëxistent structures, but because of the more perfect support and the more even distribution of the wear are stiffer and require less frequent renewal.

In the drawings, Figure 1 is an end view, partly in section, illustrating a conveyer embodying the present invention. Fig. 2 is a plan view of a portion of the conveyer, chains, and flights; and Fig. 3 is a perspective view illustrating one of the flights.

Referring to the drawings, in which similar letters denote corresponding parts, A designates the metallic chute, having the bottom $a$ and inclined sides $a'$ $a^2$. This chute is preferably made in sections in order to facilitate the removal of worn parts and substitution of new parts therefor. Within this trough operate the flights B, carried by the drive-chains C D. The drive-chains C D are here shown as comprising alternate one-part and two-part links, certain of these being provided with straps $c$ $d$, to which the flights are secured, as hereinafter described.

Each of the flights B is, as before indicated, preferably made of an integral sheet of steel bent into the desired form in any suitable manner. Each comprises a main operative portion $b$, arranged at right angles to the chute and of substantially the same width as the bottom of said chute. Each has two sides $b'$ arranged at substantially right angles to the portion $b$, and therefore in a plane parallel with the longitude of the chute. The ends of the flight are bent outwardly in a plane substantially at right angles to the sides $b'$, and therefore substantially parallel with the main portion $b$ of the flight. The straps $c$ $d$ depend from the chains C D and are separated by a space substantially the same as the distance between the sides of each flight. Said straps and the sides $b'$ of the flights are provided with perforations to receive bolts by means of which the flights are secured to said straps. The under edges of the ends $b^2$ of the flights are cut away or beveled to coincide with the inclined sides $a'$ of the chute. The under edge of the entire flight coincides, therefore, with the working surface of the chute.

It is obvious that flights constructed as herein indicated have great stiffness and rigidity and that their capacity is limited only by their depth—i. e., the distance between the main portion $b$ and the ends $b^2$. Their capacity is increased, however, by the ends $b^2$ serving not only to stiffen the flights, but also to guide material fed into the chute toward the U-shaped portion of the flights.

What I claim, and desire to secure by Letters Patent, is—

1. In a conveyer, the combination with a chute, of a U-shaped flight coacting therewith, the side members of said flight lying substantially parallel with said chute, substantially as described.

2. In a conveyer, the combination with a chute, of U-shaped flights coacting therewith, the members of said flight lying substantially parallel with said chute, the under edges of said flights conforming generally to the shape of said chute, substantially as described.

3. In a conveyer, the combination with a chute having inclined sides, of U-shaped flights coacting with said chute and carried by chains, the members of said flight lying substantially parallel with said chute, substantially as described.

4. In a conveyer, the combination with a chute, of chains, and a flight comprising a main operative portion at right angles to said chute and sides arranged in a plane substantially parallel with said chute and connected with said chains, substantially as described.

5. In a conveyer, the combination with a chute, of chains and a flight comprising a main operative portion at right angles to said chute and sides lying substantially parallel with the plane of said chute and secured directly to said chains, substantially as described.

6. In a conveyer, the combination with a chute, of chains and a flight comprising a main operative portion at right angles to said chute and sides lying substantially parallel with the plane of said chute and secured to said chains, the under edges of said flights conforming generally to the shape of said chute, substantially as described.

7. In a conveyer, the combination with a chute, of chains and a flight comprising a main operative portion at right angles to said chute, sides secured to said chains and outwardly-projecting ends, substantially as described.

8. In a conveyer, the combination with a chute having inclined sides, of chains and a flight comprising a main operative portion at right angles to said chute, sides secured to said chains and outwardly-projecting ends beveled to coincide with the incline of the sides of said chute, substantially as described.

9. An integral U-shaped conveyer-flight having a main operative portion and sides at an angle thereto, and means for securing such sides to driving-chains so as to dispose such flight in a plane substantially parallel with the plane of the chute coacting therewith, substantially as described.

10. An integral U-shaped conveyer-flight and means for securing the sides thereof directly to driving-chains, so as to dispose said flight in a plane substantially parallel with the plane of the chute coacting therewith, substantially as described.

11. A conveyer-flight comprising a main operative portion, sides substantially at right angles thereto and outwardly-projecting ends, substantially as described.

12. A conveyer-flight comprising a main operative portion, sides substantially at right angles thereto and outwardly-projecting ends, substantially parallel with said main portion, as set forth.

13. A conveyer-flight comprising a main operative portion, sides substantially at right angles thereto and outwardly-projecting ends, having beveled under edges, substantially as described.

14. A conveyer-flight comprising a main operative portion, sides substantially at right angles thereto and outwardly-projecting ends substantially parallel with said main portion, and having beveled under edges, substantially as described.

15. An integral conveyer-flight comprising a main operative portion, sides substantially at right angles thereto, means for attaching said sides to driving-chains and outwardly-projecting ends, substantially parallel with said main portion, as set forth.

This specification signed and witnessed this 5th day of September, 1901.

GEORGE W. CROSS.

Witnesses:
H. T. WOODWARD,
E. D. YARRINGTON.